United States Patent
Hingorani et al.

(10) Patent No.: US 6,708,215 B1
(45) Date of Patent: Mar. 16, 2004

(54) METHOD AND SYSTEM FOR INITIATING AN OUTBOUND COMMUNICATION FROM A SERVICE PROVIDER RESPONSIVE TO A USER ACTIVITY WITH RESPECT TO A NETWORK RESOURCE

(75) Inventors: Satyen Hingorani, Cupertino, CA (US); Gary Barnett, Brentwood, TN (US)

(73) Assignee: Aspect Communications, San Jose, CA (US)

( * ) Notice: Subject to any disclaimer, the term of this patent is extended or adjusted under 35 U.S.C. 154(b) by 272 days.

(21) Appl. No.: 09/632,095

(22) Filed: Aug. 2, 2000

Related U.S. Application Data

(63) Continuation-in-part of application No. 09/008,523, filed on Jan. 16, 1998, now Pat. No. 6,256,620.

(51) Int. Cl.[7] .............................................. G06F 13/00
(52) U.S. Cl. ...................... 709/229; 709/224; 709/225; 370/351; 370/352
(58) Field of Search ............................... 709/223, 224, 709/225, 226, 203, 227, 228, 229; 707/2, 9, 10; 370/351, 352, 355, 356, 357

(56) References Cited

U.S. PATENT DOCUMENTS

| | | | |
|---|---|---|---|
| 4,964,077 A | * 10/1990 | Eisen et al. | 345/707 |
| 5,214,688 A | 5/1993 | Szlam | 379/266.08 |
| 5,239,617 A | 8/1993 | Gardner et al. | 706/11 |
| 5,329,581 A | 7/1994 | Friedes et al. | 379/93.14 |
| 5,467,391 A | 11/1995 | Donaghue, Jr. et al. | 379/266.08 |
| 5,506,890 A | 4/1996 | Gupta et al. | 379/88.25 |
| 5,511,112 A | 4/1996 | Szlam | 379/266.06 |
| 5,627,884 A | 5/1997 | Williams et al. | 379/88.16 |
| 5,727,129 A | * 3/1998 | Barrett et al. | 706/10 |
| 5,796,952 A | * 8/1998 | Davis et al. | 709/224 |
| 5,799,292 A | 8/1998 | Hekmatpour | 706/11 |
| 5,870,769 A | 2/1999 | Freund | 707/501.1 |
| 5,875,296 A | 2/1999 | Shi et al. | 713/202 |
| 5,875,422 A | 2/1999 | Eslambolchi et al. | 704/3 |
| 5,877,757 A | 3/1999 | Baldwin et al. | 345/705 |
| 5,890,164 A | 3/1999 | Nielsen | 707/201 |
| 5,940,614 A | 8/1999 | Allen et al. | 717/120 |
| 5,951,652 A | 9/1999 | Ingrassia, Jr. et al. | 709/248 |
| RE36,416 E | * 11/1999 | Szlam et al. | 379/88.09 |
| 5,991,395 A | * 11/1999 | Miloslavsky | 379/265 |
| 6,018,724 A | * 1/2000 | Arent | 705/44 |
| 6,047,261 A | 4/2000 | Siefert | 705/11 |
| 6,310,630 B1 | * 10/2001 | Kulkarni et al. | 345/776 |

* cited by examiner

*Primary Examiner*—John Breene
*Assistant Examiner*—Cheryl Lewis
(74) *Attorney, Agent, or Firm*—Blakely Sokoloff Taylor & Zafman LLP

(57) ABSTRACT

A method of facilitating an outbound customer interaction involves monitoring user access activity, and automatically accumulating access data concerning such user access activity, with respect to a resource retrieved from one or more network locations (e.g., identified by URLs). The user access to the one or more network locations typically occurs via a user device coupled to a network to facilitate the access to the network locations. A trigger event is then detected based on the user access activity as reflected by the accumulated access data.

44 Claims, 7 Drawing Sheets

METHOD AND SYSTEM FOR INITIATING AN OUTBOUND COMMUNICATION FROM A SERVICE PROVIDER RESPONSIVE TO A USER ACTIVITY WITH RESPECT TO A NETWORK RESOURCE

The present application is a continuation-in-part (CIP) application of U.S. patent application Ser. No. 09/008,523 now U.S. Pat. No. 6,256,620, entitled "METHOD AND APPARATUS FOR MONITORING INFORMATION ACCESS", filed Jan. 16, 1998.

FIELD OF THE INVENTION

The present invention relates to customer interaction systems. More specifically, the invention provides a system that monitors the access of information by an individual or system.

BACKGROUND

Systems are available that allow an individual to search for information and conduct transactions. For example, an individual may use a web browser application to search for information stored on web servers in the form of documents (e.g., web pages). Additionally, a web browser application can be used to conduct transactions (such as bank transactions) across the Internet. Various other types of systems and applications may be used to search for information and conduct transactions.

When an individual is searching for specific information or executing a transaction, the web pages or other information sources may not provide the specific information desired by the individual. In this situation, the individual may continue searching other information sources using the same searching system or application. Alternatively, the individual may attempt to search for the desired information using a different searching system or application. For example, if the individual is unable to locate the desired information at a particular web site, the individual may try searching at a different web site or may try searching through product brochures for the desired information.

These existing systems typically provide minimal feedback to the source of the information (e.g., the organization responsible for the web server or web page) regarding the success or failure of the individual's search results. Generally, the individual does not have any options for assistance except by initiating a communication (such as a telephone call) to the organization responsible for the web page or by searching at another information source. If the individual contacts the organization responsible for the web server or web page, the representative of the organization will initially be unfamiliar with the information already obtained by the individual. Additionally, the representative will initially be unfamiliar with the number of web pages viewed and the time spent viewing each web page. Further, the representative that receives the telephone call may not have the required knowledge or expertise to provide the required information to the individual. In this situation, the individual may need to talk to another representative having the appropriate knowledge and expertise. This procedure can be tedious and time-consuming for the individual.

Certain existing systems provide a mechanism that allows a web server or other information source to track the access of information by an individual or system. These systems track information access by executing a procedure or algorithm on the web server or other information source. These systems are unable to track all accesses to information because the procedure only detects information that is retrieved directly from the web server or other information source.

SUMMARY OF THE INVENTION

According to the present invention, there is provided a method of facilitating an outbound customer interaction. Access data concerning user activity with respect to data retrieved for at least network location is automatically obtained. The user access activity occurs via a user device coupled to a network so as to provide access to the at least one network location. A trigger event is detected based on the user access activity. A communication is initiated from a service provider to the user responsive to the trigger event.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system for initiating an outbound communication from a service provider responsive to user activity with respect to a network resource are described. In the following description, for purposes of explanation, numerous specific details are set forth in order to provide a thorough understanding of the present invention. It will be evident, however, to one skilled in the art that the present invention may be practiced without these specific details.

Overview

An exemplary embodiment of a system to obtain access data concerning user access activity with respect to data retrieved from a network resource (e.g., a local server), or other networked information storage mechanism is described. Embodiments of the present invention also provide a system that initiates communication from a service provider to an accessing entity, responsive to access activity by that entity. By monitoring access activity, and accumulating access data reflecting that activity, a decision may be made to initiate communications between the service provider and the accessing entity based on the monitored access activity. In one embodiment, the service provider may be a customer support or customer information service, that may seek to establish communications with a user based on perceived uncertainty, difficulties or other access requirements that may be determined or inferred from the monitored access activity.

An embodiment of the present invention is described below within the context of a customer interaction environment. However, it will be appreciated that the teachings of the present invention may be used in any data communications environment and with any type of communications system. For example, exemplary communications that may be established include telephone calls, facsimile transmission, electronic mail (e-mail) transmissions, video sessions, or network sessions (e.g., an internet-based chat session).

Figure 1:
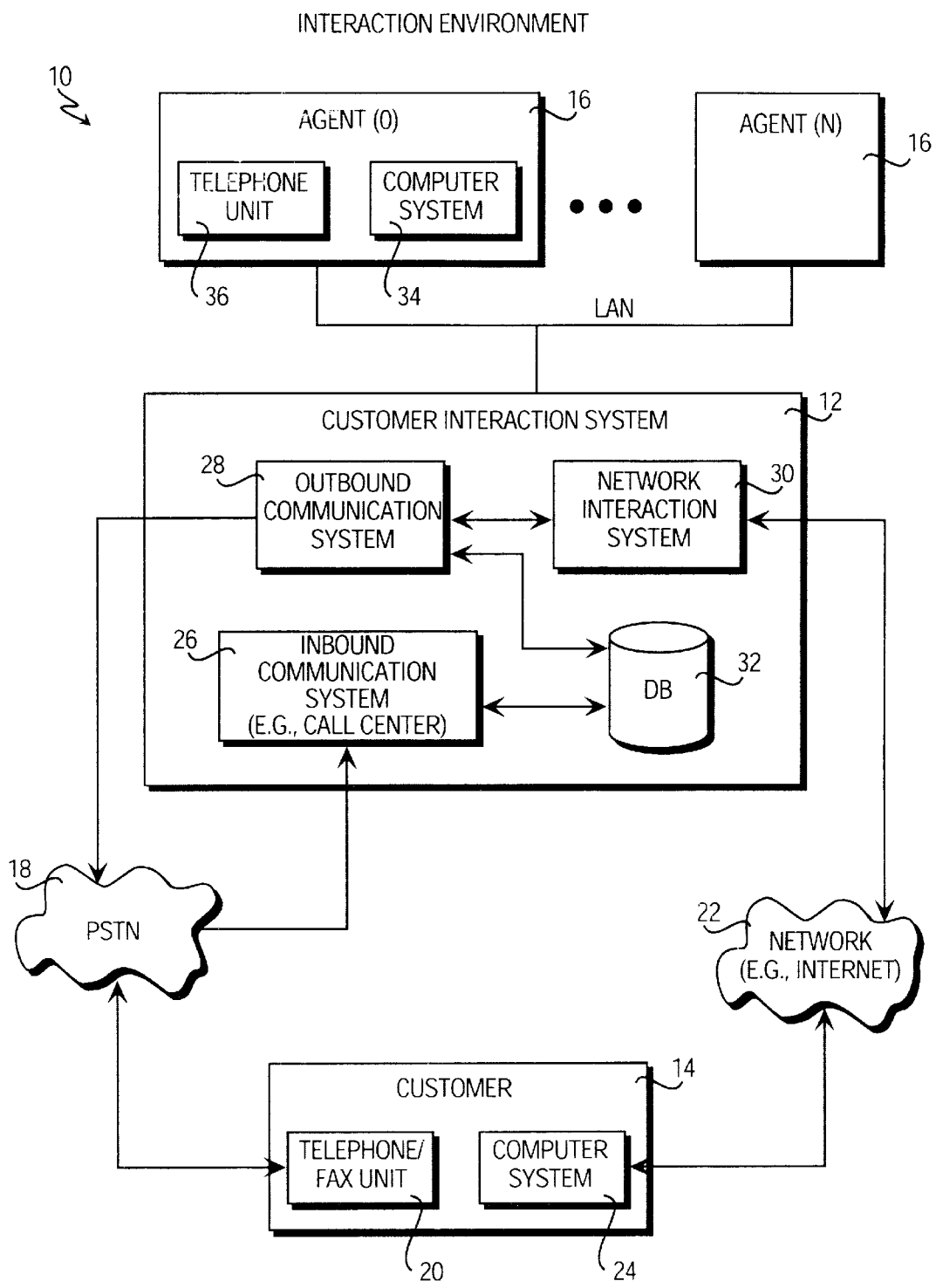
FIG. 1 is a block diagram illustrating an exemplary interaction environment facilitated by a customer interaction system.

FIG. 1 is a block diagram illustrating an exemplary interaction environment 10, facilitated by a customer interaction system 12. The customer interaction system 12 may be any system that is capable of receiving, transmitting, queuing, routing, or otherwise processing a customer interaction. Accordingly, the customer interaction system 12 may also handle mixed transactions (e.g., receive a telephone call and respond to a telephone call using e-mail).

The customer interaction environment 10 is further shown to include a user 14 (e.g., a human or automated entity) in the exemplary form of a customer or consumer that is coupled to the customer interaction system 12. The customer interaction environment 10 further includes one or more agents 16 (e.g., human agents or automated agents), that are capable of responding to requests communicated by the user 14, or direct to provide information to the user 14 based on perceived information or other needs. Each of the agents 16 is furthermore coupled to the customer interaction system 12 that serves to facilitate, broker and otherwise control interactions between the user 14 and an agent 16.

The user 14 is shown to be coupled to the customer interaction system 12 by at least two networks, namely a Public Switched Telephone Network (PSTN) 18 via which the customer may engage in, for example, telephone-based or facsimile-based communications. To this end, the user 14 is shown to have access to telephone or fax equipment 20 (e.g., a stand-alone unit or a computer based system).

The user 14 is furthermore shown to be coupled to the customer interaction system 12 via a data network 22, such as the Internet, or any other Local Area Network (LAN) or Wide Area Network (WAN). Communications by the user 14 via the network 22 may be facilitated by any network device, such as a computer system 24.

The customer interaction system 12 is shown to include a number of sub-systems, namely an inbound communication system 26, an outbound communication system 28 and a network interaction system 30. The inbound communication system 26 operates to receive, queue, route and otherwise process customer interaction requests received at the customer interaction system 12 via the PSTN 18. The inbound communication system 26 may include, for example, Automatic Call Distributor (ACD), call center, PBX, or other telephone call processing device. The outbound communication system 28 (e.g., an outbound dialer system) operates to initiate communications with a user 14 via the PSTN 18. For example, the outbound communication system 28 may perform an outbound telephone call campaign that includes automatically dialing a predetermined list of telephone numbers, detecting a customer pick up and, responsive to the customer pick up, assigning an agent to communicate to the user 14.

The network interaction system 30 may handle both inbound and outbound communications with the user 14 via the network 22. For example, the network interaction system 30 may be responsible for receiving, queuing and routing e-mail messages, network-based video sessions and network-based chat sessions. The network interaction system 30 may also be responsible for initiating outbound communications via the network 22 by, for example, communicating e-mail messages or initiating chat sessions with a user 14 via the network 22.

Each of the inbound communication system 26, the outbound communication system 28 and the network interaction system 30 are shown to be coupled, and have access to, a database 32 that stores information concerning the various agents 16 and users 14. Further details regarding the database 32 are provided below.

Each of the agents 16, which may be a human agent or automated agent, is shown to have access to both a computer system 34 and a telephone unit 36 via which the agent 16 may interact with a customer via the PSTN 18 or the network 22. The computer system 34 may also be utilized by the customer interaction system 12 to provide auxiliary information to an agent 16 so as to enable the agent 16 to respond to information requests from a user 14. To this end, the customer interaction system 12 may provide the agent 16 with scripts, document and other information that may be useful to an agent 16 in responding to a customer information request. The telephone unit 36 and the computer system 34 may furthermore be integrated into a single unit.

The present invention shall below be discussed with reference to an exemplary embodiment in which communications are initiated from a service provider (e.g., the customer interaction system 12) to a customer by way of a telephone call, which is made as part of an outbound call campaign. Nonetheless, it will readily be appreciated that the teachings of the present invention extend to any communications which may be initiated from a service provider, such as e-mail, facsimile, network-based audio or video sessions, network-based chat sessions, or any combination of such communications. Accordingly, while the communications are described above as being initiated by the outbound communication system 28, it will readily be appreciated that the network interaction system 30 of the customer interaction system 12 could initiate such communication.

Figure 2:
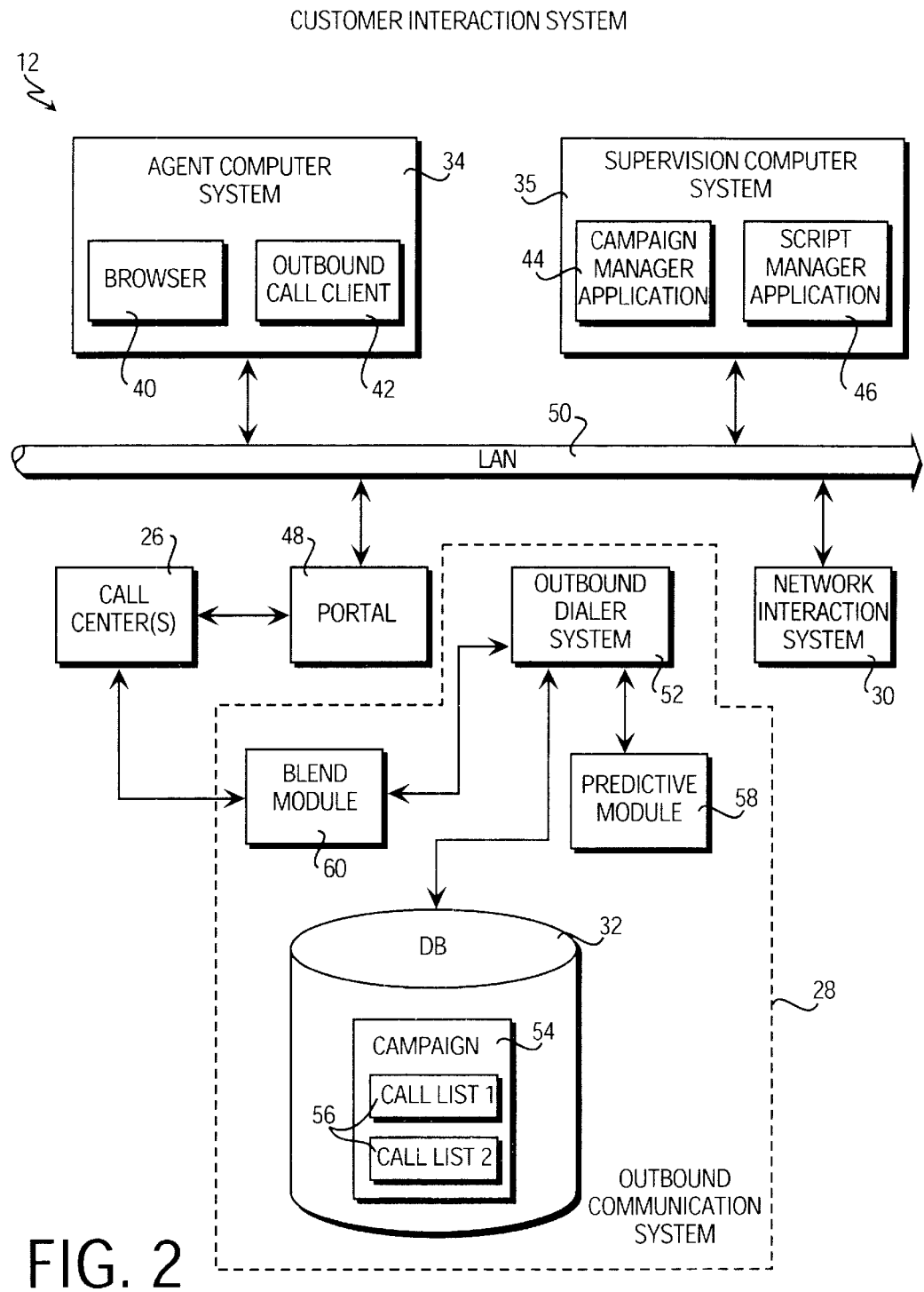
FIG. 2 is a block diagram illustrating further details regarding an exemplary customer interaction system.

FIG. 2 is a block diagram providing further details regarding an exemplary customer interaction system 12. The interaction system 12 is shown to include a Local Area Network (LAN) 50 to which are coupled a portal 48, the network interaction system 30, an agent computer system 34 and a supervisor computer system 35. The outbound communication system 28 is shown to be coupled to the portal 48, which facilitates communications between the outbound communication system 28 and other components of the customer interaction system 12.

The outbound communication system 28 is shown to include an outbound dialer system 52 that is responsible for initiating telephone calls over the PSTN 18. To this end, the outbound dialer system 52 accesses a campaign data structure 54, maintained in the database 32, that includes a number of call lists 56. Each call list 56 contains a listing of telephone numbers to be dialed by the outbound dialer system 52. The call list 56 may include data from any source. For example, in a debt collection campaign, the call list 56 can be derived from an accounting database that identifies a list of delinquent accounts. In a fund raising application, the call list 56 may be derived from a list of top donors.

The outbound dialer system 52 is software-based and accordingly provides a degree of flexibility. Specifically, the outbound dialer system 52 may offer a number of dialing modes. The dialing mode may be selected for a particular campaign depending on business policies, agent staffing levels, call context, anticipated call duration, and anticipated call volume. For example, a preview dialing mode allows an agent 16 to preview data relating to the outbound call, and to select an automatic dial button when the agent 16 is ready to initiate dialing. In a progressive dialing mode, the outbound dialer system 52 automatically places calls when an agent 16 is available, and presents pertinent call details to the agent 16. While the call is being connected, the agent 16 is presented with information (e.g., customer name, product, reason for call, script, etc.) regarding the call. In a predicted dialing mode, the outbound dialer system 52 automatically places calls to target customers by predicting a possibility of a live answer. In the predicted mode, the outbound dialer system 52 uses, for example, an answer detect facility to ascertain whether a call has been answered, and if so, whether the call was answered by a person or by a device such as a telephone answering device. Accordingly, unobtainable numbers, busy signals, and calls answered by devices or remote non-contact calls are screened out. Predictions regarding the possibility of a live answer are provided to the outbound dialer system 52 via a predictive module 58.

The outbound call system 28 further includes a blend module 60 that enables effective use of agents 16 during both peak and off-peak periods. Specifically, the blend module 60 may operate to allocate agents 16 back and forth between the outbound communication system 28 and an inbound communication system 26, such as a call center. The blend module 60 serves to alert agents 16 regarding the allocation, so that the agent 16 is provided the opportunity to prepare to handle the allocation.

To facilitate an outbound campaign, an agent computer system 34 may host both the browser 40 and outbound call client 42. The outbound call client 42 provides an agent 16 with controls required to handle outbound calls in a consolidated interface. Specifically, utilizing an interface provided by the outbound call client 42, an agent 16 may log on and off, transition dial state, change campaigns, dial, answer calls, place calls on hold, resume calls, transfer calls and hang up.

During a call, the outbound call client 42 may further present a window displaying personalized calling campaign information. Further, agents may be presented with further information via a Computer Telephonic Integration (CTI) screen that allows agents to enter the results of a customer interaction upon conclusion of a call.

The browser 40 may also provide access to a scripting system that provides scripts to an agent for the purposes of a particular campaign. The supervisor computer system 35 is shown to host both a campaign manager application 44 and a script manager application 46. The campaign manager application 44 provides a campaign supervisor with control over a campaign. Specifically, a campaign supervisor may organize sets of call lists around a common business purpose. Further, a campaign supervisor may add parameters to a campaign, such as an active period and an associated time zone. Further, the supervisor may specify data to be collected during a call and composes the fields of a wrap-up screen presented to an agent 16 via the CTI discussed above.

A script manager application 46 allows a supervisor to create scripts to guide agents with appropriate introductions and responses as they handle calls. Specifically, the script manager application 46 may be utilized to create HTML files that can include links that lead to subsequent scripts tailored to specific customer questions.

Figure 3:
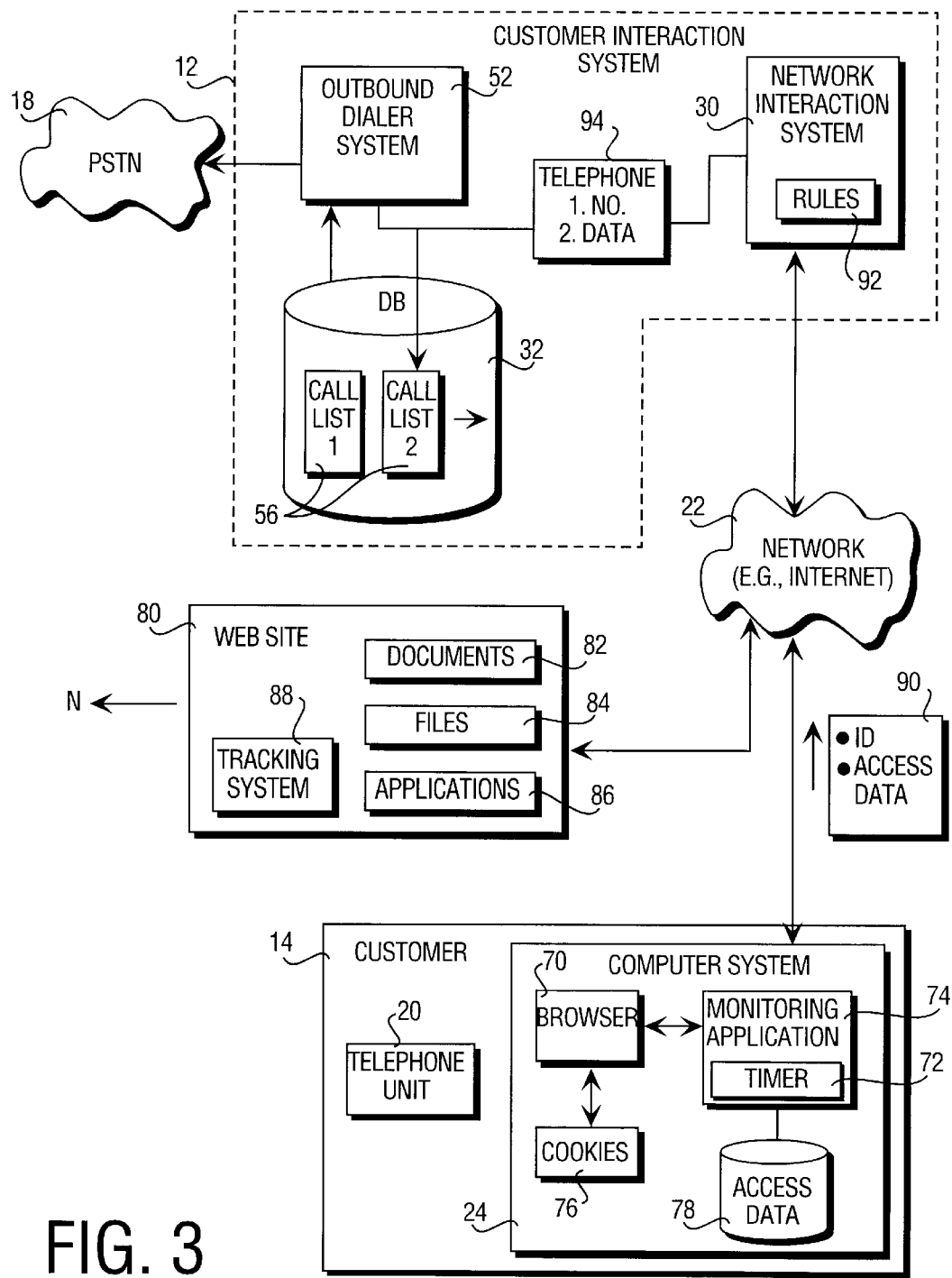
FIG. 3 is a block diagram providing further details regarding the components of a system for initiating an outbound communication from a service provider responsive to user activity with respect to a network resource, according to an exemplary embodiment.

FIG. 3 is a block diagram providing further details regarding the components of a system for initiating an outbound communication from a service provider responsive to user activity with respect to a network resource. The computer system 24 of the user 14 is shown to host at least two exemplary applications, namely a browser application 70 and a monitoring application 74. The browser application 70 may be any one of a number of commercially available browsers, such as the Internet Explorer developed by Microsoft Corporation of Redmond, Washington or the Netscape Navigator developed by Netscape Communications of Mountain View, Calif. The browser application 70 facilitates access by the user, via the computer system 24, to a variety of network locations via the network 22. For example, such network locations may include a website 80 that provides access to a number of documents 82 (e.g., markup language documents), files 84 (e.g., graphic, video, audio or text files), and applications (e.g., stand-alone applications, downloadable Java applets or ActiveX controls) 86. As is known in the art, the browser application 70 may address a network (location at which a content presented by the website 80 is available) utilizing a Uniform Resource Locator (URL) or other location identifier (e.g., a directory path).

The browser application 70 is also shown to facilitate the storing of identification information in the form of "cookies" 76 on the computer system 24. Cookies 76 are used for maintaining state within a session between the browser application 70 and a particular website 80, and also for allowing a website 80 to identify a user so as to provide customized information and to track repeat accesses by a user, via a browser application 70, to multiple network locations. Cookies 76 may accordingly be utilized by a website operator to provide insight into user access activity in that the website operator is able to identify multiple requests, to multiple locations, as having originated from a particular user. In this way, the website provider is able to compose a view of a "click stream", or other user access activity, for a particular user. A website 80 may include a tracking system 88 in order to facilitate the server-side tracking of user access activity to network locations. Further, as opposed to using cookies 76, a website operator may use session identifiers to track user access activity.

The computer system 24 of the user 14 is also shown to host the monitoring application 74 that functions to provide client-side tracking of the user access activity to a resource (e.g., a document) retrieved from a network location via the browser application 70. In one embodiment, the monitoring application 74 is a stand-alone application that a user may selectively install and execute on the computer system 24 to facilitate the provision of customer interaction, or customer relationship management, services to the user. In an alternative embodiment, the monitoring application 74 may be an applet that executes within the context of the application 70. For example, the application 74 may be a Java applet that utilizes a Java Virtual Machine (JVM) (not shown) embodied within the browser application 70. In this case, the monitoring application 74 may also be uploaded to the computer system 24 responsive to the user directing the browser application 70 to access a website that provides customer support, or that facilitates customer relationship management. The uploading and executing of the monitoring application 74 may, in this case, again be voluntary or provided as a default service provided by a particular website 80.

The monitoring application 74 is shown to include a timer 72, which operates to record time intervals (periods) associated with the user accesses to a specific network location or a specific resource detained from a network location. The monitoring application 74 further operates to log network resources (e.g., indicated by URLs) that are accessed via the browser application 70. To this end, commercially available browser applications 70, as is known in the art, include APIs that provide a "hook" for external applications (e.g., the monitoring application 74) to extract a URL that identifies a resource currently being accessed via the browser application 70.

Access data (e.g., time spent viewing a particular document retrieved from a network location, the URLs indicating a network locations accessed, etc.) are stored as access data 78 by the monitoring application 74. One advantage of client-side monitoring performed by the monitoring application 74 is that the monitoring application 74 is able to monitor retrieved information accessed by the application 70 and originally obtained from a particular network location, that may be stored in a cache resource for further access. Such a cache resource may be accessed via the network 22, or may be local to the computer system 24. For example, a browser application 70 provides caching functionality whereby a HTML document retrieved from a network location is cached on the computer system 24. Upon receipt of a subsequent user request to access the relevant HTML document, this document is simply retrieved from the cache resource. In this case, a server-side tracking system, for example operated by the website 80, would not detect such a subsequent access to the relevant HTML document. The monitoring application 74, on the other hand, has client-side perspective and is able to detect and monitor such a subsequent accesses to data originally retrieved from a network location.

The monitoring application 74 communicates a data packet 90 periodically, or upon the occurrence of a predetermined trigger event (e.g., a user views a particular HTML document for a predetermined period of time), exhibits a specific network access, or views a predetermined number of pages from a particular website that may pertain to a particular topic to the customer interaction system via the network 22. The data packet 90 may include an identifier for the relevant computer system 24, or the user 14, this identifier being extracted, for example, from a cookie. The data packet 90 further includes access data 78, as determined and stored by the monitoring application 74. This access data 78 may comprise a full record of a user access activity with respect to one or more network locations, or may in an alternative embodiment, comprise a summary of such user access activity. For example, the record may indicate a list of activities (e.g., page views) and time devoted to each of such activities. Further, the access data 78 may record one or more network locations, and a switching pattern or switching frequency between such one or more network locations. In a further embodiment, the data packet 90 may also include a telephone number, an email address, fax number, page number, network address, or other contact information for the user 14.

The data packet 90 is received at the network interaction system 30 of the customer interaction system 12. The network interaction system 30 includes a detector in the exemplary form of a stored set of rules 92, according to which the information included within the data packet 90 (i.e., at least the accessed data 78) is interpreted to determine whether a trigger event has occurred that justifies an initiation of communication, by the customer interaction system 12, between the customer and a service agent 16. In one embodiment, the rules 92 are specified by a campaign supervisor, utilizing the campaign manager application 44 described with reference to FIG. 2. The rules 92 may dictate any one of a number of trigger events. For example, the rules 92 may determine that communications should be initiated if a user 14 has viewed a particular document for a predetermined number of times, has repeatedly returned to a particular document a predetermined number of times, has a exhibited certain number of repeat views of a specified set of documents, has switched between two or more documents a number of times, or has exhibited a predetermined switching pattern or frequency between a set of document, each of the documents having been retrieved from a network location. It will be appreciated that a wide variety of rules, both default and custom, may be embodied within the rules 92.

Should the network interaction system 30 determine, based on trigger events detected utilizing the access data 78, that communications should be initiated between a service agent 16 and user 14, the network interaction system 30 communicates a further data packet 94 to the outbound communication system 28. The data packet 94 may include contact information (e.g. a telephone number) and further data reflecting a reason for the initiation of communications. For example, such data could indicate a trigger event was detected according to the rules 92 (e.g., repetitive switching between two or more documents) as well as further specific information (e.g., products or services to which the relevant documents pertained). In one embodiment, this information is also included within a script that may be presented to an agent via a browser 40 executing on an agent computer system 34.

Responsive to the receipt of the data packet 94, the outbound communication system 28 creates an entry within an appropriate call list 56 maintained within the database 32, a call then being initiated by the outbound communication system 28 according to the call list 56.

While the exemplary embodiment described above has focused on adding an entry to a call list 56 accessed by outbound communication system 28, communications may be initiated in any one of a number of manners. For example, the network interaction system 30 may itself send an e-mail to the customer, and specifically to an identified mail address for the customer, inquiring whether the customer requires assistance or providing further information to the customer that is perceived by the customer interaction system 12 to be useful to the user 14 based on the access data 78 received by the network interaction system 30. Further, the network interaction system 30 may communicate with a facsimile subsystem (not shown), a pager subsystem (not shown), or interactive voice, audio (e.g., IP telephony) or text chat subsystems to initiate communications to a network address.

Further, while the rules 92 for detecting a trigger event and making a determination as to whether communications should proactively be initiated with customer are shown to reside and be implemented within the context of the customer interaction system 12, such rules may also be implemented on the client-side within the monitoring application 74. In a further embodiment, the monitoring application 74 may thus communicate directly with, for example, the outbound communication system 28 to initiate communications between a service provider and the customer upon the detection of a trigger event by the monitoring application 74.

Figure 4A:
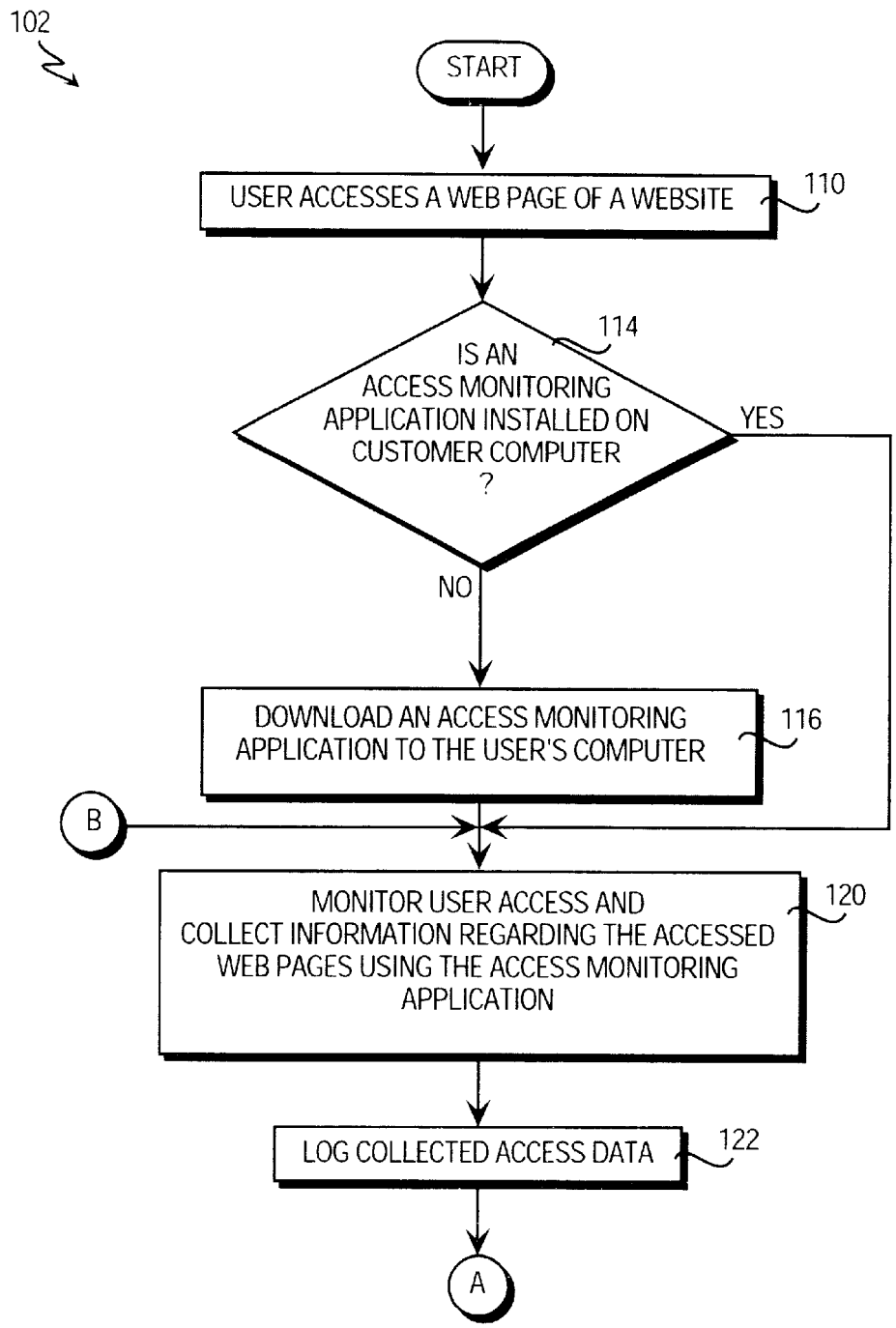
FIGS. 4A–4B show a flow chart illustrating an exemplary method of initiating an outbound communication from a service provider responsible to user activity with respect to network resources.
Figure 4B:
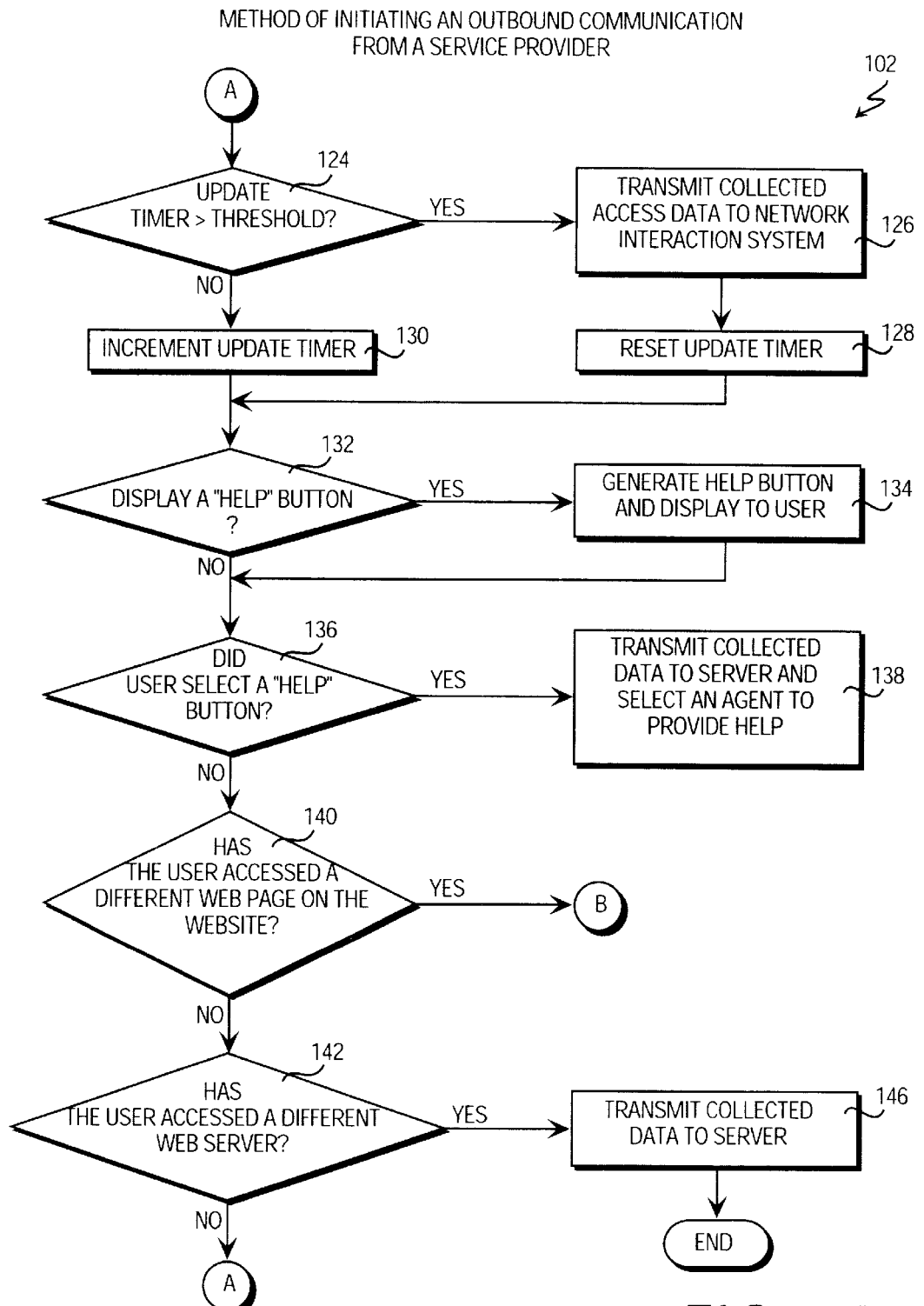

FIGS. 4A–4B show a flow chart illustrating a method 102, according to an exemplary embodiment, of initiating an outbound communication from a service provider responsive to user activity with respect to network resources. The method 102 is described within the context of the customer interaction system 12 described above with reference to FIGS. 1–3. Nonetheless, it will be appreciated that this method 102 may be implemented within the context of any customer interaction system, or transaction processing system. The method 102 commences at block 110, with a user access to a network location (e.g., a web page of a website). At block 114, the website 80 may determine whether the access monitoring application 74 is installed and executing on the customer computer system 24. If not, at block 116, the access monitoring application 74 may be downloaded to the customer computer system 24 from website 80, or from the customer interaction system 12. In one embodiment, the customer interaction system 12 may furthermore be integrated with the website 80. In one embodiment, the access monitoring application 74 may be a JavaScript method that is capable of invoking a Java applet. As described above, the access monitoring application 74 is executed on the computer system 24, and is capable of monitoring network locations accesses by the user 14. The access monitoring application 74 may, in one embodiment, be downloaded once per user session (e.g., the first time a web server is accessed by the user 14). In an alternative embodiment, the computer system 24 may store the access monitoring application 74 after the session has ended, thus obviating the need to download the application 74 for each access.

Further, as described above, access monitoring may be performed from the server-side, in which case the steps of downloading the access monitoring application 74, as described above, may not be required.

Because the access monitoring application 74 is executed on the computer system 24, the application 74 is able to monitor user activity with respect to all content retrieved from a network, whether that content is actively retrieved by the network, or from a local storage facility (e.g., a cache). For example, when monitoring web page access, the monitoring application 74 is able to track user selection of the "back" and "forward" functions to retrieve an appropriate web page from a cache storage device of the computer system 24.

At block 120, the access monitoring application 74 is utilized to monitor user activity and to collect information regarding access network locations, and content retrieved from such network locations. At block 122, the access monitoring application 74 logs such collected access data 78.

In one embodiment of the present invention, documents retrieved via the network 22 (e.g., from the website 80) may include information that is specifically tailored for use by the customer interaction system 12 to enable the customer interaction system 12 intelligently to take actions with respect to such content. For example, a web page may include a proprietary "tag" that demarcates information embedded within a web page that is meaningful to the customer interaction system 12. For example, the tagged information may provide an indication as to the content of the web page (e.g., a product or service that is displayed or discussed in the web page). Such "tag" information may not be visible to the user 14, but may be harvested by the monitoring application 74 and included within the stored access data 78 that is communicated to the customer interaction system 12. Accordingly, in one embodiment, at block 122, the access monitoring application 74, in addition to logging a network location identifier or content identifier, may log a description of the information retrieved from a network location that is meaningful to the customer interaction system 12. At decision block 124, a determination is made by the monitoring application 74 whether a time threshold for the transmission of the access data 78 has passed. If so, at block 126, the access data 78 is transmitted as part of a data packet 90, via the network 22, to the network interaction system 30. At block 128, an update counter maintained by the timer 72 is reset. Alternatively, should the time threshold be exceeded, the update counter maintained by the timer is incremented at block 130.

At decision block 132, a determination is made as to whether a help button should be displayed. If so, at block 134, such a "help" button is generated and displayed to the user.

At decision block 136, a determination is made as to whether a user 14 has performed a selection of the "help" button. If so, the collected access data 78 is again transmitted to the network interaction system 30 via the access monitoring application 74 in the form of the data packet 90.

At decision block 140, a determination is made as to whether a user has accessed a further network location (e.g., retrieved a web page from website 80). If so, the method 102 loops back to block 120, where the method again cycles through blocks 120–136 to collect and communicate access data 78 pertinent to the newly accessed network location.

At block 142, a determination is made as to whether a user has accessed the network location within a further network domain (e.g., whether the user 14 has accessed a further website that may not be serviced by the customer interaction system 12). If so, the access monitoring application 74 may not, in one embodiment, monitor access to such a further network domain, and may accordingly, responsive to access to the further network domain, transmit all collected access data 78 at block 146.

On the other hand, should it be determined at decision block 142 that the user 14 has not accessed a further network domain, the method 102 loops back to decision block 124.

Figure 5:
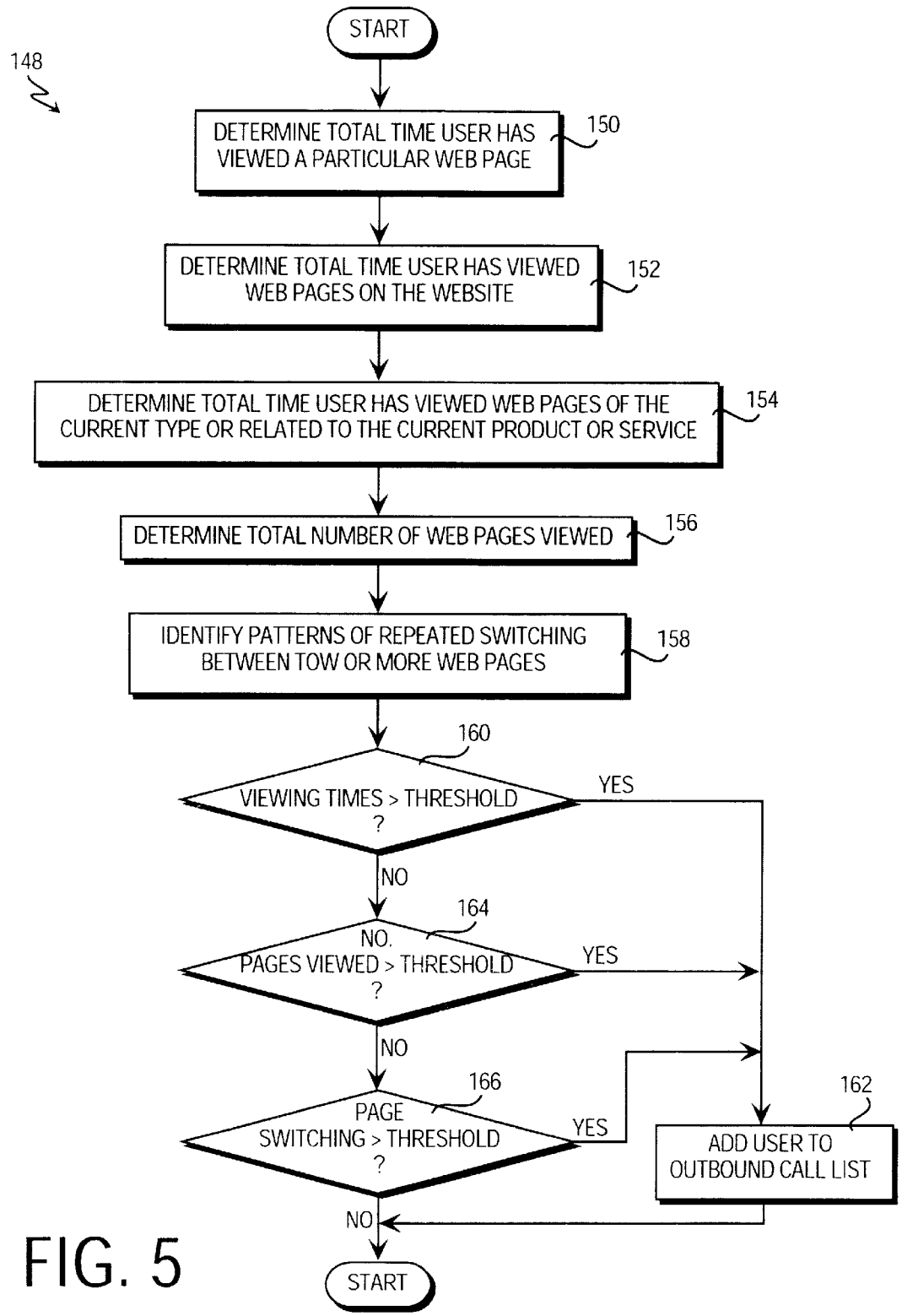
FIG. 5 is a flow chart illustrating an exemplary method of detecting trigger events responsive to which communications may be initiated by a service provider between a service agent and a user.

FIG. 5 is a flow chart illustrating a method 148 of detecting trigger events responsive to which communications may be initiated by a service provider between a service agent and a user. The method 148 may, in one embodiment, be embodied within the rules 92 executed by the network interaction system 30 or, in an alternative embodiment, executed within the context of the access monitoring application 74.

The method 148 commences at block 150 with a determination, by the access monitoring application 74 with reference to the timer 72, of the total time that a user 14 has viewed or accessed a resource retrieved from a particular network location. For example, the total time that a user 14 has viewed a particular web page may be determined. The web page may be delivered for viewing within the browser application from the network location, or form a cache resource.

At block 152, a determination is made regarding the total time that a user 14 has viewed a resource obtained from a particular network domain (e.g., a particular website or web server). Again, this determination may be made at the client-side by the monitoring application 74 or at the server-side by the network interaction system 30.

At block 154, a determination is made regarding the total time that a user 14 has accessed network resources of a particular type, or related to a particular product or service. For example, the total time that the user has spent viewing web pages describing a particular product may be determined and calculated.

At block 156, a determination is made as to the total number of resources obtained from network locations. For example, a determination of the total number of web pages viewed by user 14 may be made.

At block 158, patterns of network accesses, or of accesses to resources originally delivered from a network, or deleted.

For example, a pattern of repeated switching between two or more web pages may be identified.

At decision block 160, a determination is made as to whether the viewing times determined at blocks 150, 152 and 154 exceed the respective thresholds associated with each of those viewing times. At decision block 164, a determination is made as to whether the total number of network resources accessed exceeds a predetermined threshold.

At decision block 166, a determination is made as to whether an access pattern with respect to a resource constitutes a trigger event. For example, a predetermined number of switches between two or more web pages may exceed a predetermined threshold thus constituting a trigger event.

Accordingly, each of the determinations made at decision blocks 160, 164 and 166 provide an example of detecting a trigger event based on user access activity to a network location or to a resource obtained from such a network location.

Following a positive determination at any one of the decision blocks 160, 164 and 166, the method 148 proceeds to block 162, where communications to the user 14 are proactively initiated from the service provider (e.g., the customer interaction system 12). In one embodiment, the initiation of such communications comprises adding user details, including a telephone number, to an outbound call list 56 as described above. In alternative embodiments, user details may be added to an e-mail distribution list, a fax queue, a web-based session list or other outbound communication list.

Figure 6:
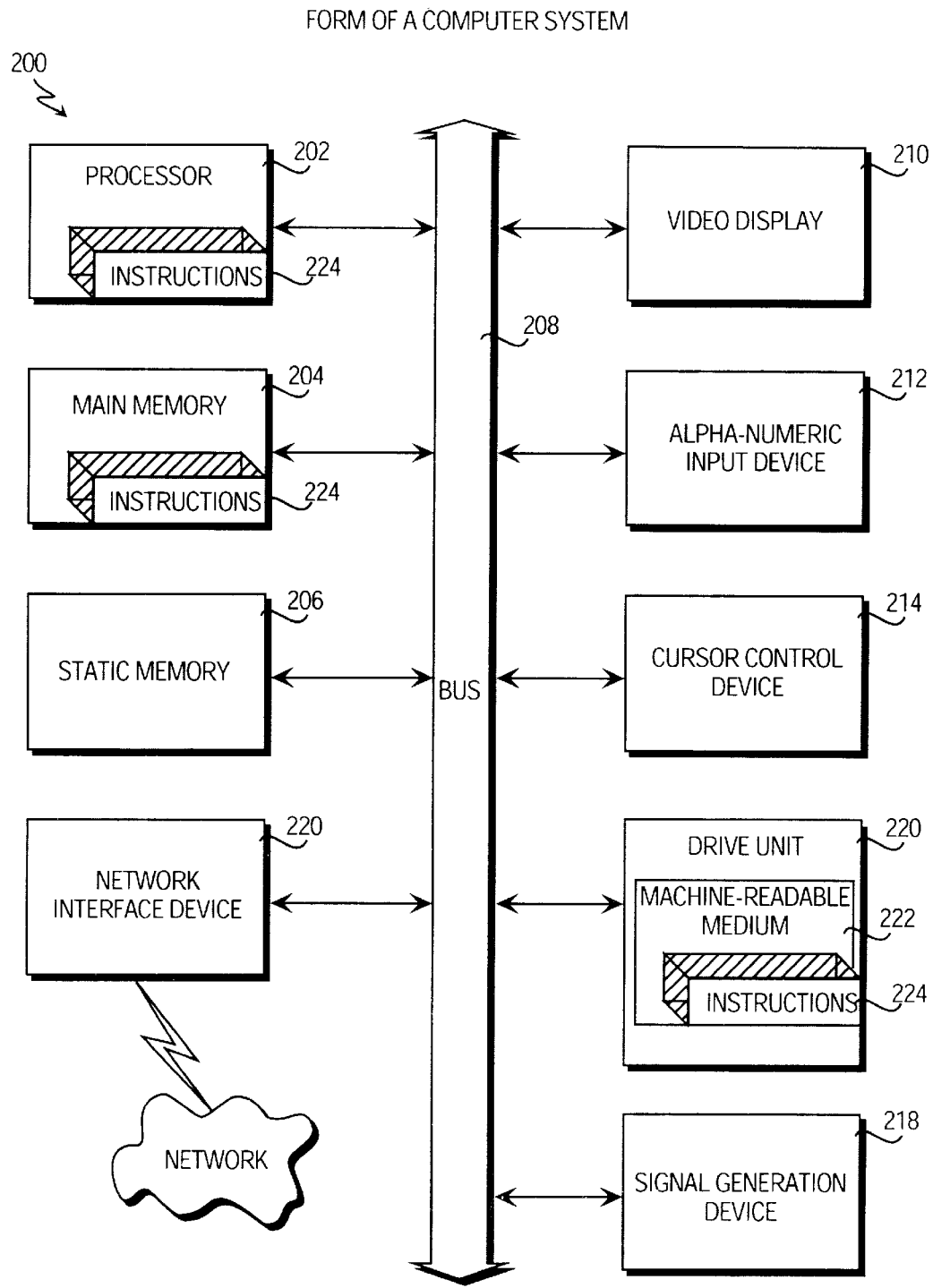
FIG. 6 is a diagrammatic representation of a machine in the exemplary form of a computer system.

FIG. 6 shows a diagrammatic representation of a machine in the exemplary form of a computer system 200 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 200 includes a processor 202, a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g. a keyboard), a cursor control device 214 (e.g. a mouse), a disk drive unit 216, a signal generation device 218 (e.g. a speaker) and a network interface device 220.

The disk drive unit 216 includes a machine-readable medium 222 on which is stored a set of instructions (i.e., software) 224 embodying any one, or all, of the methodologies described above. The software 224 is also shown to reside, completely or at least partially, within the main memory 204 and/or within the processor 202. The software 224 may further be transmitted or received via the network interface device 220. For the purposes of this specification, the term "machine-readable medium" shall be taken to include any medium which is capable of storing or encoding a sequence of instructions for execution by the machine and that causes the machine to perform any one of the methodologies of the present invention. The term "machine-readable medium" shall accordingly be taken to included, but not be limited to, solid-state memories, optical and magnetic disks, and carrier wave signals.

Thus, a method and system for initiating an outbound communication from a service provider responsive to user activity with respect to a network resource have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of facilitating an outbound customer interaction, the method including:

automatically obtaining access data concerning user access activity with respect to a resource retrieved from at least one network location, the resource being retrieved via a user device coupled to a network so as to provide access to the user to the at least one network location;

detecting a trigger event based on user access activity with respect to the resource retrieved from the at least one network location and as recorded in the access data; and initiating a communication from a service provider to the user responsive to the trigger event, wherein the user access activity is monitored at a location remote from the user device.

2. The method of claim 1 wherein the user access activity is monitored at the at least one network location.

3. The method of claim 1 wherein the user access activity is monitored at the user device.

4. The method of claim 3 including providing an access monitoring application to the user device via the network, the access monitoring application monitoring the user access activity with respect to the resource retrieved from the at least one network location.

5. The method of claim 4 wherein the access monitoring application communicates data concerning the user access activity to the service provider via the network.

6. The method of claim 1 wherein the access data is automatically obtained regarding the user access activity with respect to resources retrieved from a plurality of network locations.

7. The method of claim 1 wherein the resource comprises at least one markup language document.

8. The method of claim 7 wherein the at least one markup language document is retrieved from a single network domain.

9. The method of claim 1 wherein the resource comprises a plurality of markup language documents retrieved from a plurality of network domains.

10. The method of claim 9 where each of the plurality of network domains comprises a website.

11. The method of claim 1 wherein the access data indicates viewing time with respect to the resource from the at least one network location.

12. The method of claim 11 wherein the detecting of the trigger event comprises detecting exceeding of a time threshold by the viewing time.

13. The method of claim 1 wherein the resource comprises a number of documents, and the access data indicates a total number of documents viewed within a time interval.

14. The method of claim 13 wherein the detecting of the trigger event comprises detecting exceeding of a threshold number of documents viewed within a predetermined time interval.

15. The method of claim 13 wherein each of the documents comprises a markup language document.

16. The method of claim 1 wherein the access data indicates an access pattern with respect to the resource.

17. The method of claim 16 wherein the detection of the trigger event comprises detecting a predetermined access pattern with respect to the resource.

18. The method of claim 1 wherein the initiation of the communication comprises including a contact identifier within an outbound customer interaction campaign.

19. The method of claim 18 wherein the contact identifier comprises any one of a group including a telephone number, an e-mail address, a network address, a page number and a fax number.

20. The method of claim 1 wherein the initiation of the communication comprises attempting to establish a switched-circuit connection between the service provider and the user, the attempt being performed responsive to a request by the service provider.

21. The method of claim 1 wherein the initiation of the communication comprises establishing a packet-switched communication session between the service provider and the customer, the packet-switched communication session being initiated by the service provider.

22. A system to facilitate an outbound customer interaction, the system including:
   a monitor automatically to obtain access data concerning user access activity with respect to a resource retrieved from at least one network location, the resource being retrieved via a user device coupled to a network so as to provide access to the user to the at least one network location;
   a detector to detect a trigger event based on user access activity with respect to the resource retrieved from the at least one network location and as recorded in the access data; and
   a communicator to initiate a communication from a service provider to the user responsive to the trigger event, wherein the monitor is installed at a location remote from the user device, and the monitor is to monitor the user access activity from the location remote from the user device.

23. The system of claim 22 wherein the user access activity is monitored at the at least one network location by the monitor.

24. The system of claim 22 wherein the monitor is installed on the user device, and the monitor is to monitor the user access activity at the user device.

25. The system of claim 24 wherein the monitor comprises an access monitoring application that is supplied to the user device via the network, the access monitoring application monitoring the user access activity with respect to the resource retrieved from the at least one network location.

26. The system of claim 25 wherein the access monitoring application communicates data concerning the user access activity to the service provider via the network.

27. The system of claim 22 wherein the monitor automatically obtains the access data regarding the user access activity with respect to resources retrieved from a plurality of network locations.

28. The system of claim 22 wherein the resource comprises at least one markup language document.

29. The system of claim 28 wherein the at least one markup language document is retrieved from a single network domain.

30. The system of claim 22 wherein the resource comprises a plurality of markup language documents retrieved from a plurality of network domains.

31. The system of claim 30 where each of the plurality of network domains comprises a website.

32. The system of claim 22 wherein the access data indicates viewing time with respect to the resource from the at least one network location.

33. The system of claim 32 wherein the detector is to detect exceeding of a time threshold by the viewing time.

34. The system of claim 22 wherein the resource comprises a number of documents, and the access data indicates a total number of documents viewed within a time interval.

35. The system of claim 34 wherein the detector is to detect exceeding of a threshold number of documents viewed within a predetermined time interval.

36. The system of claim 34 wherein each of the documents comprises a markup language document.

37. The system of claim 22 wherein the access data indicates an access pattern with respect to the resource.

38. The system of claim 37 wherein the detector is to detect a predetermined access pattern with respect to the resource.

39. The system of claim 22 wherein the communicator is to include a contact identifier within an outbound customer interaction campaign.

40. The system of claim 39 wherein the contact identifier comprises any one of a group including a telephone number, an e-mail address, a network address, a page number and a fax number.

41. The system of claim 22 wherein the communicator comprises an outbound dialer system to establish a circuit-switched connection between the service provider and the user, the establishing of the circuit-witched connection being performed by the outbound dialer system responsive to a request by the service provider.

42. The system of claim 22 wherein the communicator comprises a network device to establish a packet-switched communication session between the service provider and the customer, the packet-switched communication session being initiated by the service provider.

43. A machine-readable medium storing a sequence of instructions that, when executed by a machine, cause the machine to:
   automatically obtain access data concerning user access activity with respect to a resource retrieved from at least one network location, the resource being retrieved via a user device coupled to a network so as to provide access to the user to the at least one network location;
   detect a trigger event based on user access activity with respect to the resource retrieved from the at least one network location and as recorded in the access data; and
   initiate a communication from a service provider to the user responsive to the trigger event, wherein the user access activity is monitored at a location remote from the user device.

44. A system to facilitate an outbound customer interaction, the system including:
   first means for automatically obtaining access data concerning user access activity with respect to a resource retrieved from at least one network location, the resource being retrieved via a user device coupled to a network so as to provide access to the user to the at least one network location;
   second means for detecting a trigger event based on user access activity with respect to the resource retrieved from the at least one network location and as recorded in the access data; and
   third means for initiating a communication from a service provider to the user responsive to the trigger event, wherein the first means is installed at a location remote from the user device, and the first means is for monitoring the user access activity from the location remote from the user device.

* * * * *